United States Patent [19]
Black

[11] 3,874,437
[45] Apr. 1, 1975

[54] WINDSHIELD COVER

[76] Inventor: Sidney L. Black, 1823 Sherry Ln., Route 2, Edmond, Okla. 73034

[22] Filed: Nov. 5, 1973

[21] Appl. No.: 413,283

[52] U.S. Cl............................. 160/368 S, 296/95 C
[51] Int. Cl............................................... B60j 1/20
[58] Field of Search........ 160/368 S, 368 R, DIG. 2, 160/DIG. 7, 354; 296/95 R, 95 C

[56] References Cited
UNITED STATES PATENTS

| | | | |
|---|---|---|---|
| 2,223,145 | 11/1940 | Wise | 160/368 S UX |
| 2,804,135 | 8/1957 | Sutton | 160/368 S |
| 3,336,969 | 8/1967 | Marchman | 160/368 S |
| 3,588,169 | 6/1971 | Lunt | 160/368 S X |

Primary Examiner—Philip C. Kannan
Attorney, Agent, or Firm—Robert K. Rhea

[57] ABSTRACT

A panel of sheet material dimensioned to overlie a vehicle windshield is provided with loop forming hems in its bottom and end edges. An elongated strip of pliable buoyant material is contained by the bottom hem for insertion into a vehicle windshield wiper well. An elongated rod is inserted through the respective panel end hem for removably receiving, at its respective ends, a length of resilient material connected, intermediate its ends, with a clip for gripping an adjacent lateral edge surface of the vehicle.

4 Claims, 8 Drawing Figures

PATENTED APR 1 1975 3,874,437
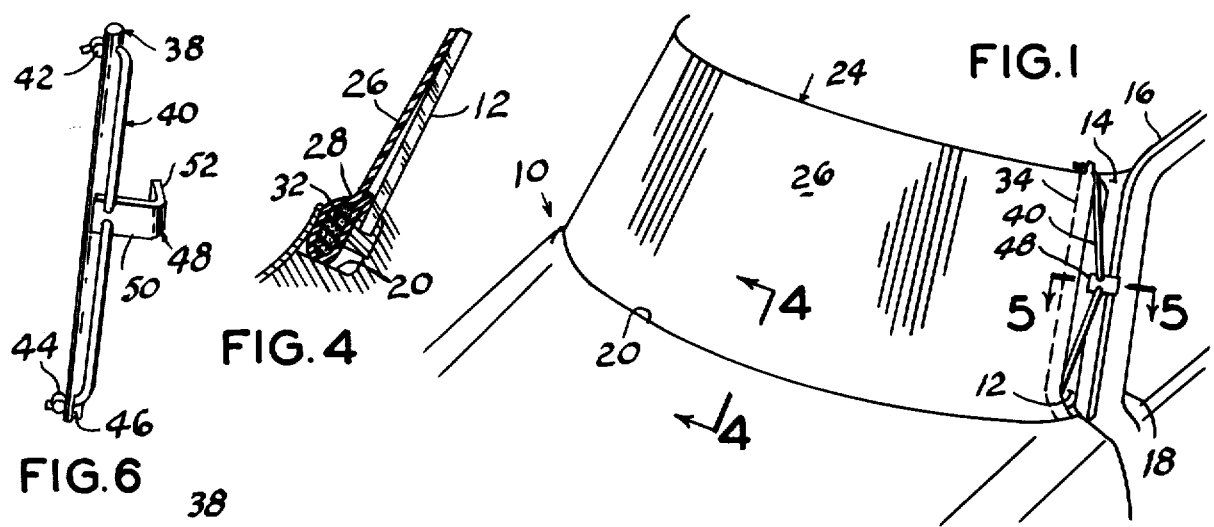
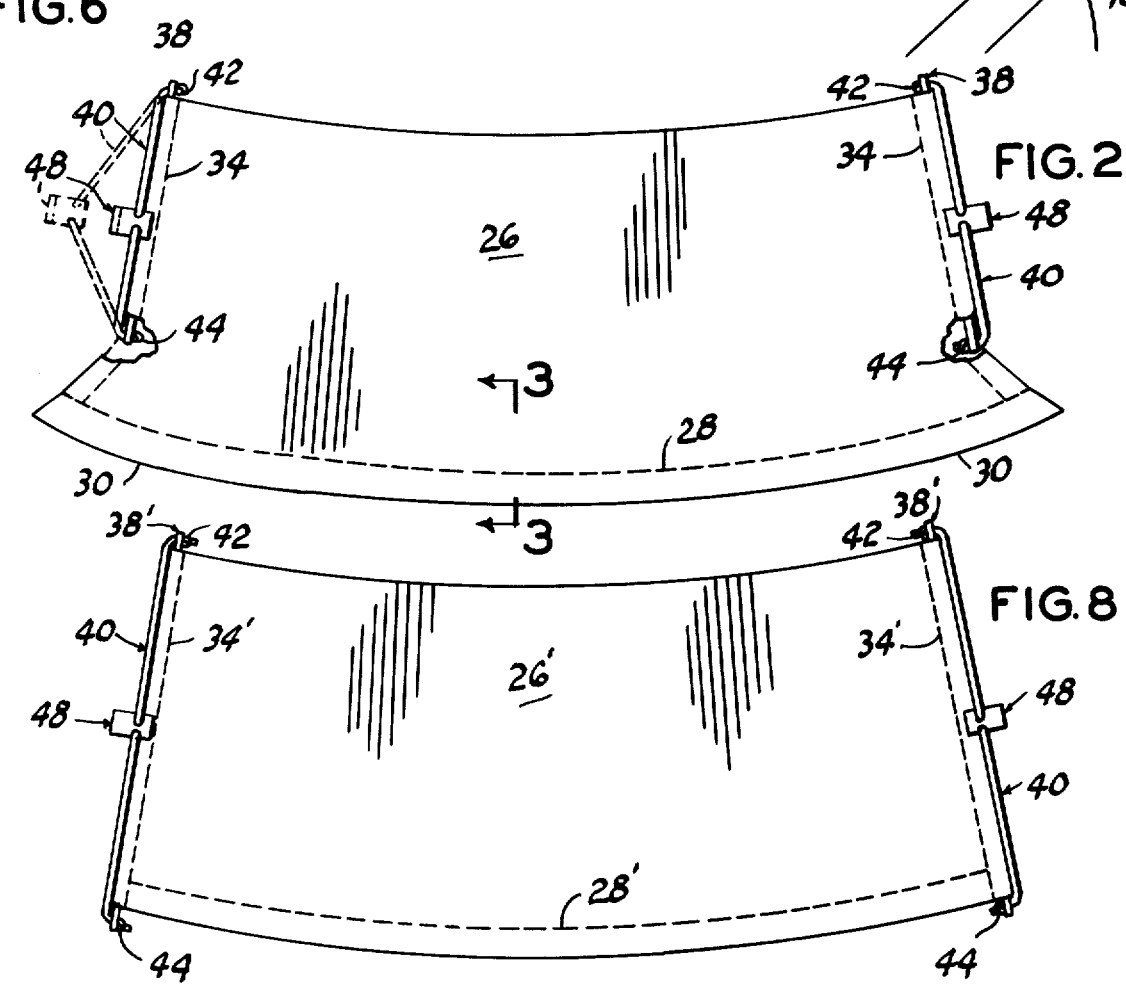
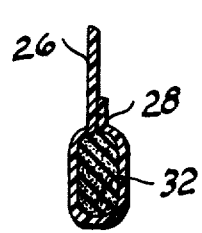
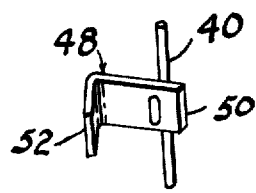
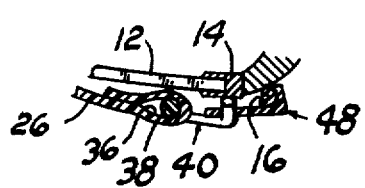

WINDSHIELD COVER

BACKGROUND OF THE INVENTION

1. Field of the invention

The present invention relates to a windshield protector or cover for preventing a collection of snow, ice, or other foreign material on the windshield when the vehicle is not in use.

2. Description of the prior art

Sheet material windshield covers are well known but for the most part comprise relatively thin plastic sheet material which is provided with small permanent magnets, at its respective corners and/or intermediate its marginal edges, intended to secure the cover in place by a contact with the metallic surfaces of the vehicle surrounding the marginal edges of the windshield, such as is disclosed by U.S. Pat. No. 3,263,736.

The principal objection to this type of windshield cover is that the magnetic attraction of the magnets for the metallic surfaces is insufficient to prevent gusts of wind lifting one or more corner portions of the cover and sometimes blowing the entire cover off or at least allowing snow or freezing rain to cover a portion of the windshield. Further, in the event a vehicle owner attempts to put such a cover in place, after freezing rain has begun to collect on the windshield and vehicle to prevent further accumulation of ice on the windshield, the coefficient of sliding friction between the respective magnet and metallic surfaces it overlies is reduced to such an extent that gusts of wind easily displaces the cover.

Other types of fastening means for securing windshield covers in place is disclosed by U.S. Pat. Nos. 2,223,145 and 2,823,746. These patents disclose connecting a stretcher rod to the respective ends of the cover which is in turn connected with a resilient member secured to the vehicle door handle as in U.S. Pat. No. 2,223,145 or by clips engaging a side surface of the vehicle as in U.S. Pat. No. 2,823,746.

Windshield covers disclosed by these patents have operated satisfactorily on windshields of vehicles in use at the time these patents were granted, but do not operate as satisfactorily on vehicle windshields presently in use, which are formed in a "wrap around" configuration and are inclined rearwardly and upwardly which results in a tendency of the above patented windshield covers to slip upwardly, with respect to the windshield, toward the vehicle top and not remain in place as a result of wind action and the tension applied to the cover by its resilient connectors.

This invention is distinctive over the above patents by providing a loop forming hem in its longitudinal bottom edge portion which is filled by an elongated strip of pliable buoyant material, approximately 2 square inches in cross-section area, which forms a stiffener for the cover tending to prevent displacement by wind gusts and which provides a stop for maintaining the cover in place when the windshield wipers are disposed on the outer surface of the cover adjacent the stiffener portion. Further, on vehicles having a windshield wiper well at the juncture of the windshield depending edge and the hood of the vehicle the stiffener is manually forced into this well in a frictional wedging action which securely maintains the cover in place and further prevents snow and ice collection within the windshield wiper well.

SUMMARY OF THE INVENTION

An elongated panel of sheet material, dimensioned to overlie a vehicle windshield, is provided with loop forming hems in its respective end portions and at least its bottom edge portion. An elongated strip of pliable buoyant material, such as foamed plastic or foam rubber, preferably having a cross-sectional area of at least two square inches and coextensive with the length of the panel, is inserted into the bottom hem thereof to form a panel stiffener which is manually forced into the windshield wiper well. A stretcher rod is inserted into the respective panel end edge hem and is removably connected with a length of elastic cord material having a hook or clip connected thereto, intermediate its ends, for engaging a side surface of the vehicle adjacent the respective end of the windshield being covered.

The principal object of this invention is to provide a vehicle windshield cover for protecting a windshield from a collection of snow or ice which may be easily connected with the vehicle and which includes a stiffener portion along its depending marginal edge for preventing displacement of the cover with respect to the windshield around the marginal edges thereof.

BRIEF DESCRIPTION OF THE DRAWINGS

FIG. 1 is a fragmentary perspective view of the windshield cover in place on a fragment of a vehicle;

FIG. 2 is a plan view, to a larger scale, of the preferred embodiment of the windshield cover with portions broken away for clarity and illustrating, by dotted lines, the stretching movement of one of the attaching means;

FIG. 3 is a fragmentary vertical cross-sectional view, to a further enlarged scale, taken substantially along the line 3—3 of FIG. 2;

FIG. 4 is a fragmentary vertical cross-sectional view, to a larger scale, taken substantially along the line 4—4 of FIG. 1;

FIG. 5 is a horizontal cross-sectional view, to a larger scale, taken substantially along the line 5—5 of FIG. 1;

FIG. 6 is a perspective view of one of the stretcher rods and attaching clips;

FIG. 7 is a fragmentary perspective view illustrating one manner of connecting the resilient cord to the clip; and, FIG. 8 is a plan view illustrating another embodiment of the cover.

DESCRIPTION OF THE PREFERRED EMBODIMENTS

Like characters of reference designate like parts in those figures of the drawings in which they occur.

In the drawings:

Referring more particularly to FIGS. 1 through 7, the reference numeral 10 indicates a vehicle, such as an automobile, having a windshield 12 surrounded and supported by a windshield molding 14 normally provided with a gutter known as a drip rail 16 along the respective side of the vehicle top and extending forwardly and downwardly at the respective end limit of the windshield forwardly of the vehicle door frame 18. Late model vehicles are usually provided with a windshield well 20 formed principally by the rearward edge limit of the vehicle hood terminating in forwardly and upwardly spaced relation with respect to the depending forward limit of the windshield. The windshield wiper well normally hides the windshield wiper arms and blades from view when not in use. The above description is substantially conventional with vehicles presently in use with which the present invention is intended to be used.

The reference numeral 24 indicates the cover, as a whole, comprising an elongated substantially rectangular panel of plastic or fabric sheet material 26 having top, bottom and end edges dimensioned to overlie and substantially cover the vehicle windshield 12. Nine ounce weight sheet material has been found satisfactory. The bottom marginal edge portion of the panel 26 is doubled back upon itself and stitched to provide a coextensive loop or hem, indicated by the dotted lines 28. The bottom edge portion of the panel and the hem 28, formed therein, is preferably contoured or longitudinally curved at least at its respective end portions, as at 30, to conform to the configuration of the depending limit of the vehicle windshield 12. Similarly the top edge of the panel is arcuately curved longitudinally to conform to the marginal edge of the windshield 12. An elongated strip of pliable buoyant material 32, such as foamed plastic or foam rubber, preferably having a cross-sectional area of at least 2 square inches, is surrounded by and fills the hem 28, thus the hem 28 and pliable material 32 form a pliable stiffener for the bottom marginal edge of the panel 26. The respective end edge surfaces of the panel converge toward each other in a direction opposite the hem 28 to conform to the windshield marginal end edges and are doubled back upon themselves and stitched, as at 34, to form hems or loops 36 at the respective ends of the panel. A stretcher rod 38 is inserted into each of the end hems or loops 36. The length of each rod 38 is less than the transverse width of the panel 26 but is substantially equal to the end dimension of the windshield 12 to be convered.

As shown in FIG. 6, one end portion of each rod 38 is provided with a transverse aperture which coaxially receives one end portion of an elastic cord 40, or the like, having a knot 42 in its end to maintain it in place. The other end portion of the cord 40 is similarly knotted, as at 44, and inserted between legs 46 formed by bifurcating the other end of the rod. The bifurcated end of the rod 38 projects out through an opening formed in the panel material forming the respective end edge hem for removably receiving the knot 44 of the cord.

A clip 48, substantially J-hook shaped in general configuration, has its leg portion 50 provided with at least one aperture which permits threaded reception of an intermediate portion of the cord so that the foot or hook portion 52 of the clip may removably engage an intermediate portion of the drip rail 16.

In the alternative embodiment, illustrated by FIG. 8, the panel end edge hems 34' are coextensive with the transverse width of the panel 26' and the stiffener rods 38' project beyond the respective end limits of the hems 34' a distance sufficient to accommodate the resilient cord 40 and its knotted end portions. In this embodiment the strip filled depending hem 28' forms a stiffener overlying the depending edge portion of the windshield being covered.

OPERATION

In operation the panel 26 is manually positioned over the windshield 12 and its stiffener forming depending hem manually deformed and forced into the windshield wiper well 20. The clips 48 are engaged with the drip rail 16 at the respective side of the vehicle. In the event the vehicle is not provided with a drip rail, the clips 38 may be engaged with the windshield molding 14.

When using the alternative panel embodiment 26', after engaging the clips with a side edge surface of the vehicle the windshield wipers, not shown, are lifted over the depending marginal hem to overlie the panel wherein the hem and its filler forms a stop preventing wind gusts lifting or moving the panel.

Obviously the invention is susceptible to changes or alterations without defeating its practicability, therefore, I do not wish to be confined to the preferred embodiment shown in the drawings and described herein.

I claim:

1. A protective cover for a windshield of a vehicle, comprising:
   a generally rectangular panel of flexible sheet material adapted for positioning in overlying relation on the windshield of the vehicle and when so positioned defining top, bottom and end edge portions, said panel being provided with loop forming hems near its bottom and end edge portions;
   an elongated strip of buoyant pliable material having a transverse cross-section area of at least 2 square inches within and coextensive with the bottom hem for forming a wind resistant panel stiffener;
   a stretcher rod within each said end edge hem; and,
   flexible means connected with the respective end portions of each said stretcher rod for securing said panel to adjacent side portions of the vehicle.

2. In a protective cover for a windshield of a vehicle, said vehicle having a windshield wiper well adjacent and coextensive with the depending edge portion of the windshield, the improvement comprising:
   a generally rectangular panel of flexible sheet material adapted for positioning in overlying relation on the windshield of the vehicle and when so positioned defining top, bottom and end edge portions, said panel being provided with loop forming hems near its bottom and end edge portions;
   an elongated strip of buoyant pliable material having a transverse cross section area of at least two square inches within and coextensive with the bottom edge hem for manual insertion into the windshield wiper well and forming a wind resistant connection between the vehicle and the bottom edge portion of said panel;
   a stretcher rod within each said end edge hem; and,
   flexible means connected with the respective end portions of each said stretcher rod for securing said panel to adjacent side portions of the vehicle.

3. The windshield cover according to claim 2 in which said flexible means includes:
   a resilient cord; and,
   a hook-shaped clip connected with said resilient cord intermediate its ends.

4. The windshield cover according to claim 3 in which at
   least one end portion of each said stretcher rod is bifurcated for removably receiving one end portion of said resilient cord.

* * * * *